United States Patent [19]

Yasunaka

[11] Patent Number: 4,660,283

[45] Date of Patent: Apr. 28, 1987

[54] DYNAMICALLY BALANCED APPARATUS HAVING RECIPROCATING MEMBER

[75] Inventor: Shinsaku Yasunaka, Hikone, Japan

[73] Assignee: Matsushita Electric Works, Ltd., Osaka, Japan

[21] Appl. No.: 896,377

[22] Filed: Aug. 14, 1986

[30] Foreign Application Priority Data

Sep. 20, 1985 [JP] Japan ................................ 60-208428

[51] Int. Cl.[4] ............................................. B26B 19/28
[52] U.S. Cl. ......................................... 30/43.92; 74/49
[58] Field of Search ........................... 30/43.92; 74/49

[56] References Cited

U.S. PATENT DOCUMENTS

| 2,773,306 | 12/1956 | Ranson | 30/43.92 |
| 3,594,902 | 7/1971 | Otto | 30/43.92 |
| 3,714,711 | 2/1973 | Daniels | 30/43.92 |
| 3,783,508 | 1/1974 | Brown | 30/43.92 |
| 3,831,273 | 8/1974 | Wellinger | 30/43.92 |
| 4,030,573 | 6/1977 | Buzzi | 30/43.92 |
| 4,065,977 | 1/1978 | Buzzi | 74/49 |
| 4,167,060 | 9/1979 | Sakamoto | 30/43.92 |
| 4,233,733 | 11/1980 | Gallanis | 30/43.92 |
| 4,312,126 | 1/1982 | Rochelt | 74/49 |
| 4,570,499 | 2/1986 | Durr | 74/49 |

FOREIGN PATENT DOCUMENTS 54-76358  6/1979  Japan .

Primary Examiner—Jimmy C. Peters

Attorney, Agent, or Firm—Pollock, Vande Sande & Priddy

[57] ABSTRACT

A dynamically balanced apparatus having a reciprocating member includes an eccentric shaft operatively connected to a motor output shaft, and a drive member operatively connecting the eccentric shaft to the reciprocating member for driving the reciprocating member upon rotation of the eccentric shaft. An eccentric flyweight is mounted on the output shaft to be rotatable therewith for canceling the vibration or inertia force developed by the motion of the reciprocating member. Also included in the apparatus is a vibrator also driven by the eccentric shaft to vibrate in a direction perpendicular to the reciprocating direction. For eliminating the vibration inherently arising from the rotation of the eccentric shaft and acting in the direction perpendicular to the reciprocating direction, at least one counterweight is carried on the vibrator to be movable therewith for canceling such inherent vibration in the direction questioned. A novel feature of the present invention resides in that the counterweight is disposed at a location spaced longitudinally outwardly of the drive member to be in substantially longitudinal alignment with the drive member and the eccentric flyweight. Consequently, the counterweight can be conveniently received in longitudinal end of the apparatus housing without requiring any additional space on the lateral side of the apparatus housing, while providing dynamic balancing of all moving parts to effectively cancel unpleasant vibrations in all directions.

12 Claims, 16 Drawing Figures

DYNAMICALLY BALANCED APPARATUS HAVING RECIPROCATING MEMBER

BACKGROUND OF THE INVENTION

1. Field of the Invention

The present invention is directed to a dynamically balanced appartus having a reciprocating member driven by an electric motor, and more particularly a dynamically balanced shaver of reciprocatory type driven by the motor.

2. Description of the Prior Art

It is well known in the art to provide dynamic balancing of an apparatus having a reciprocating member for eliminating excess vibration, as seen in U.S. Pat. No. 4,167,060, which discloses an electric shaver of reciprocatory type including an inner cutter driven by an electric motor through a mechanism of translating rotary motion of the motor into reciprocatory motion of the inner cutter. This patent utilizes an eccentric flyweight as a counterbalance which is mounted on the end of an output shaft of the motor in order to provide dynamic balance for offsetting the vibration or inertia force developed by the reciprocating motion of the inner cutter. Considering that such eccentric flyweight rotates around the axis of the motor output shaft in a circular orbit, it produces, in addition to the vibratory motion in the reciprocating direction of the cutter, another vibratory motion or inertia force in a direction perpendicular to the reciprocating direction of the inner cutter so as to cause undesired vibration in that direction. In this sense, the patent is not completely satisfactory and effective in eliminating the vibration in all directions.

To solve this problem, it has been contemplated by the same inventor of the present invention to add a separate counterweight to the above mechanism for offsetting the undesired vibratory motion of the eccentric flyweight, as shown in Japanese Publication (KOKAI) No. 54-76358 of 1979 of Unexamined Patent application. The added counterweight is held on one end of a resilient plate having the other end fixed to a shaver housing. The resilient plate is operatively connected to the motor output shaft adjacent to the eccentric flyweight in such a way as to be movable together with the counterweight in the direction perpendicular to the reciprocating direction of the inner cutter upon rotation of the motor shaft, eliminating the undesired vibration in the direction perpendicular to the reciprocating direction of the inner cutter.

Although the above scheme well eliminates the undesired vibration and therefore the fatigue of the user grasping the shaver, there arises another problem that the added counterweight requires more spacing on the lateral side of the eccentric flyweight to thereby increase unduly the lateral dimension of the shaver, since the added counterweight is disposed at a location spaced laterally away from the eccentric flyweight in the direction perpendicular to the reciprocating path of the inner cutter. In view of the above, it has been mostly desired to add the counterweight without causing any substantial increase in the shaver dimensions, particularly in the lateral dimension thereof.

SUMMARY OF THE INVENTION

The present invention obviates the above disadvantage while retaining the effect of eliminating the undesired vibrations and user fatigue. An improved dynamically balanced apparatus having a reciprocating member in accordance with the present invention comprises a motor having an output shaft, an eccentric shaft operatively connected to the output shaft in eccentric relation thereto, and drive means operatively connecting the eccentric shaft to the reciprocating member for driving the reciprocating member in a reciprocating path upon rotation of the eccentric shaft around the axis of the motor output shaft. An eccentric flyweight is mounted on the end of the output shaft to be rotatable therewith for canceling the vibration or inertia force developed by the reciprocating motion of the reciprocating member.

Included in the apparatus is a vibrator which is operatively connected to the eccentric shaft to be driven thereby to vibrate in a direction perpendicular to the reciprocating path of the reciprocating member. At least one counterweight is carried on the vibrator to be movable together therewith for canceling the inherent vibration or inertia force developed by the eccentric rotation of the flyweight and acting in the direction perpendicular to the reciprocating path, thus eliminating the remaining undesired vibration inherently resulting from the use of the eccentric flyweight and therefore reducing the fatigue of the user operating the apparatus.

The characterizing feature of the present invention resides in that the counterweight is disposed at a location spaced longitudinally outwardly of the drive member to be in substantially longitudinal alignment with the drive member and the eccentric flyweight along the reciprocating path. With this result, the counterweight can be received in longitudinal end of the apparatus housing without requiring any additional space on the lateral side of the housing, while retaining the effect of canceling the vibration developed by the reciprocating member and acting in the reciprocating direction as well as the vibration developed by the eccentric flyweight and acting in the direction perpendicular to the reciprocating direction.

Accordingly, it is a primary object of the present invention to provide an improved dynamically balanced apparatus having the reciprocating member which is capable of being made in compact, particularly with respect to the lateral dimension thereof, yet assuring to provide dynamic balancing of all the moving parts driven by the motor and eliminate the undesired vibrations in all directions.

The present invention discloses several advantageous structures of the vibrator for effectively canceling the undesired vibrations or counterbalancing the moving parts of the apparatus, which is therefore another object of the present invention.

In a preferred embodiment of the present invention, the vibrator is formed to have the counterweights on its longitudinal ends in order to coincide the center of the combined mass of the vibrator and the counterweights with the connecting portion of the vibrator to the eccentric shaft within a plane perpendicular to the axis of the eccentric shaft. This enables balancing of the combination vibrator and counterweights in the axial direction of the eccentric shaft so as to prevent excessive radial load from acting upon the eccentric shaft, which in turn assures smooth driving connection between the eccentric shaft and the vibrator, contributing to effectively drive the vibrator together with the reciprocating member at a minimum loss.

It is therefore a further object of the present invention to provide a dynamically balanced apparatus having the reciprocating member which is capable of effectively driving the vibrator carrying the counterweights and the reciprocating member by a common eccentric shaft without causing considerable loss in the driving mechanism thereof.

In this connection, the drive member is preferred to be connected to the eccentric shaft at an axial position closer to the root portion of the shaft than the vibrator since the drive member is responsible for transmitting a greater driving force to the reciprocating member utilized as an actual working member than the vibrator as an internal vibration-canceling member. Otherwise, the the free end portion of the eccentric shaft would be chargeable for transmitting the greater driving force, exaggerating the radial load inevitably developed in translating the eccentric rotary motion into the reciprocatory motion and consequently causing unduly increased or excessive radial load to be applied to the eccentric shaft. In such condition, effective translation would be no longer expected and the apparatus would certainly suffer from jerky movement of the reciprocating member.

The present invention finds its advantageous application for an electric shaver having an inner cutter defining the above reciprocating member. In this application, the counterweight can be conveniently received in a space which is normally left outside of the drive member and below the inner cutter within the length of the reciprocating path of the inner cutter, thus requiring no extra dimensions of the shaver for incorporating the counterweight.

It is therefore a still further object of the present invention to provide a dynamically balanced electric shaver which is capable of conveniently incorporating the mechanism of providing dynamic balancing of all moving parts, yet maintaining the bulk of the shaver at a minimum.

These and still other objects and advantageous features will become more apparent from the following detailed description of the preferred embodiment of the present invention when taken in conjunction with the accompanying drawings.

BRIEF DESCRIPTION OF THE DRAWINGS

FIG. 5, composed of FIGS. 5A to 5D, illustrates the operational sequence of a vibrator and counterweight combination with respect to the motion of the inner cutter of the above electric shaver;

FIG. 8, composed of FIGS. 8A to 8D, illustrates the operational sequence of the vibrator and counterweights combination with respect to the motion of the inner cutter of the electric shaver of FIG. 6;

DETAILED DESCRIPTION OF THE PREFERRED EMBODIMENTS

Figure 1:
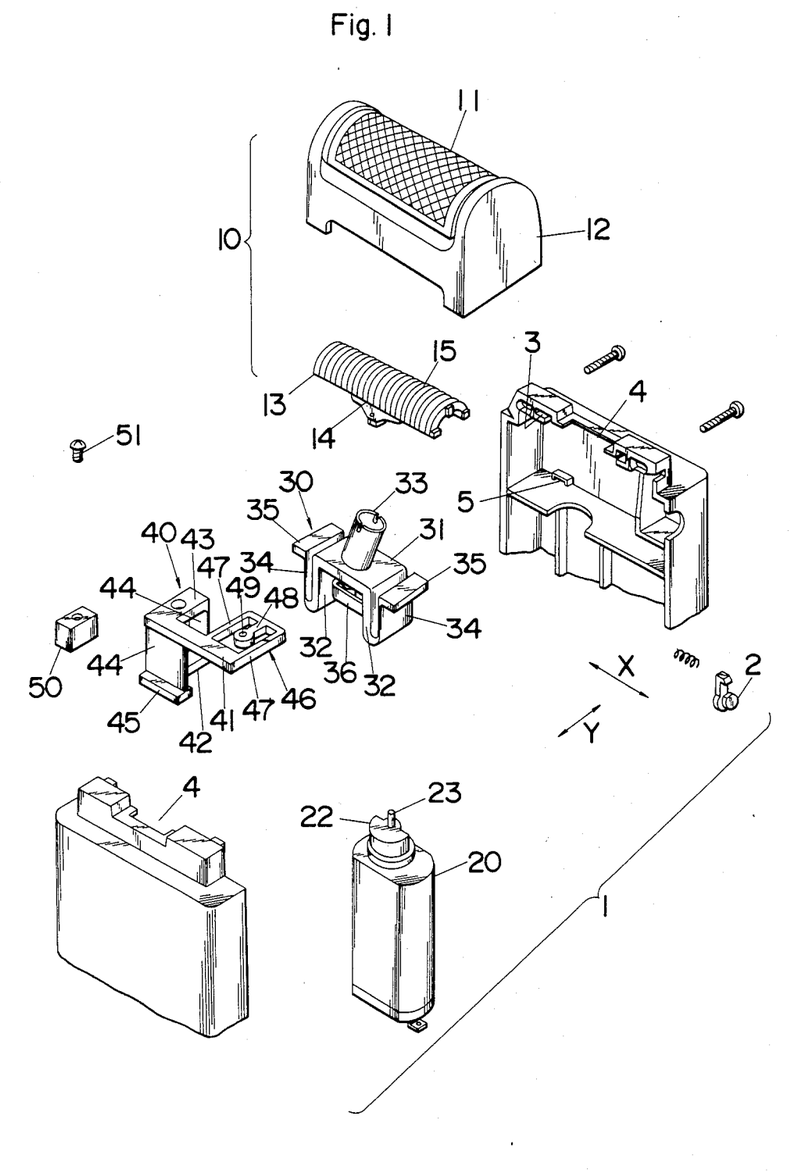
FIG. 1 is an exploded perspective view illustrating a principal portion of a dynamically balanced electric shaver in accordance with a first embodiment of the present ivention.
Figure 2:
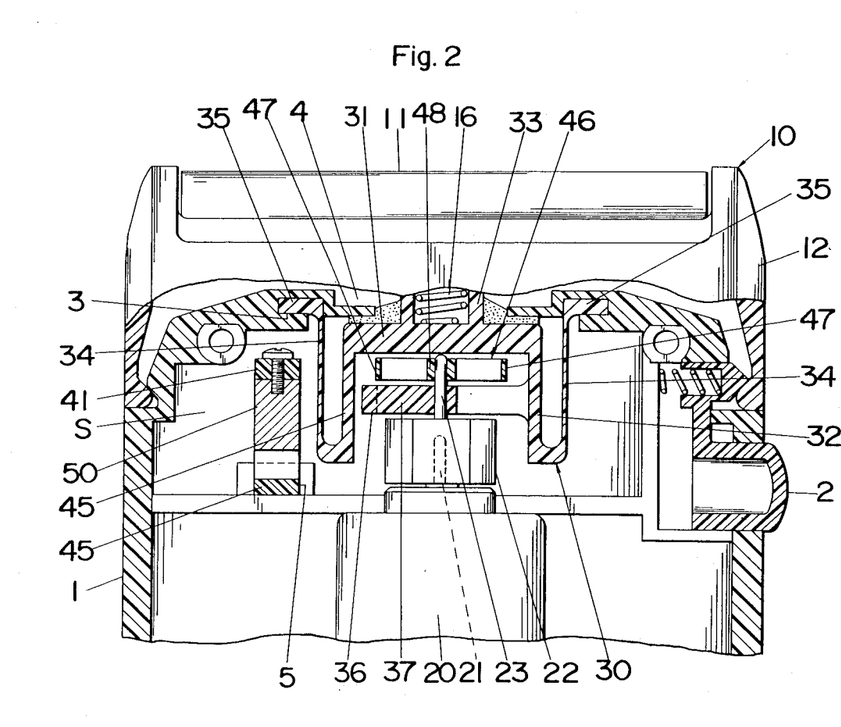
FIG. 2 is a fragmentary front view, partly in section, of the, above electric shaver.
Figure 3:
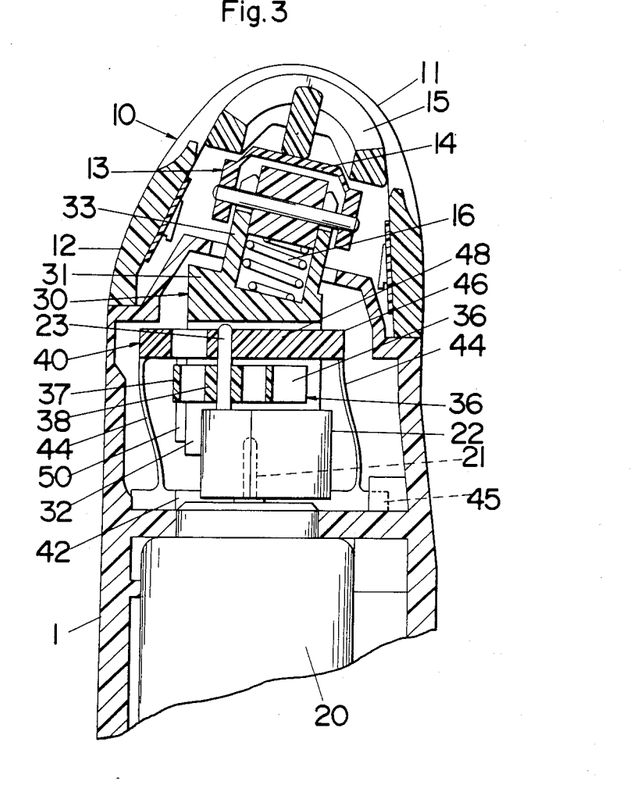
FIG. 3 is a fragmentary sectional view, partly in side elevation, of the above electric shaver.

Referring now to FIGS. 1 to 3, there is illustrated a dynamically balanced electric shaver in accordance with a first preferred embodiment of the present invention. The electric shaver comprises a two-piece plastic housing 1 mounting thereon a cutting head 10 composed of an outer shearing foil 11 and an inner cutter 13 driven to reciprocate by an electric motor 20 mounted within the housing 1. The outer shearing foil 11 is held by a frame 12 which is detachable away from the housing 1 upon pressing a button 2 mounted on the upper side of the housing 1. The inner cutter 13 includes a base 14 carrying thereon a series of spaced arcuate cutting blades 15 which are urged by a spring 16 into shearing contact with the outer shearing foil 11. The motor 20, which is energized by a battery (not shown) mounted within the housing 1, has its output shaft 21 connected to an eccentric flyweight 22 having an eccentric shaft 23 which is parallel to the motor output shaft 21 in an offset relation thereto, as best shown in FIG. 3, and which is driven to rotate around the axis of the output shaft 21 in a circular orbit.

Figure 4:
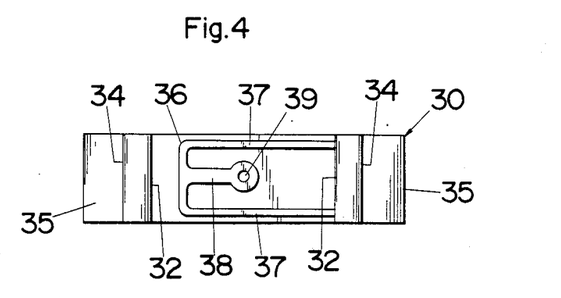
FIG. 4 is a bottom view of a drive member employed in the above electric shaver.

The inner cutter 13 is operatively connected to the eccentric shaft 23 through a drive member 30 which is cooperative therewith to translate the rotary motion of the motor 20 into the reciprocatory motion of the inner cutter 13. The drive member 30 is an integrally molded plastic member formed to include an inverted U-shape rigid portion 31 having downward extensions 32 at its longitudinal ends and having thereon a bushing 33 for coupling with the inner cutter 13, a pair of resilient legs 34 of reduced thickness each extending upwardly from the lower end of the extension 32 and terminating in a mounting tab 35 of rigid construction, and a bearing arm 36 extending longitudinally from the one of the extensions 32 toward the other. The drive member 30 is supported within the housing 1 by fixing the mounting tab 35 thereto so that it is movable only in its longitudinal direction, indicated by an arrow X in FIG. 1, as flexing the resilient legs 34 in that direction, the mounting tabs 35 being press-fitted respectively into grooves 3 in the upper portion of the housing 1 adjacent to an opening 4 through which the bushing 33 of the drive member 30 extends upwardly for connection with the inner cutter 13. As best shown in FIG. 4, the bearing arm 36 is in the form of an E-shaped configuration with a pair of resilient segments 37 and a center segment 38 having in its free end a bearing hole 39 into which the eccentric shaft 23 extends for driving connection with the drive member 30. Each of the resilient segments 37 extends longitudinally and connected at its end to the downward extension 32 such that it is capable of flexing only in the lateral direction, indicated by an arrow Y in the figure, thus absorbing the lateral displacement applied thereto. Whereby the rotary motion of the eccentric shaft 23 around the axis of the motor output shaft 21 can be converted to the reciprocatory motion of the drive member 30 or the inner cutter 13.

The eccentric flyweight 22 is introduced for counterbalancing the vibration or inertia force attendant upon the reciprocating movement of the inner cutter 13 so as to eliminate the vibration and user fatigue. That is, as shown in FIGS. 5A to 5D, the center of the mass of the eccentric flyweight 22 is flung in the opposite direction to the reciprocating direction X of the inner cutter 13 for eliminating the vibration acting on the housing 1 in the reciprocating direction X. However, there remains another vibration inherently developed by the rotary motion of the eccentric flyweight 22 and acting in the direction Y perpendicular to the reciprocating direction of the inner cutter 13.

For eliminating such vibration in the direction Y perpendicular to the reciprocation, a vibrator 40 carrying a counterweight 50 is driven by the same eccentric shaft 23 to vibrate in 90° out of phase relation to the reciprocating inner cutter 13 in order to counterbalance the inertia force developed in the perpendicular direction Y upon rotation of the eccentric flyweight 22. The vibrator 40 is an integrally molded plastic member of similar structure to the drive member 30 and includes an elongated upper rigid portion 41 provided at its longitudinal end with a laterally extending bearing arm 46 for driving connection with the eccentric shaft 23 and provided at the other longitudinal end with a holder 43 for carrying the counterweight 50. Depending from the lateral sides of the holder 43 are a pair of resilient legs 44 having the lower ends connected to a lower rigid portion 42. A mounting flange 45 integral with the lower rigid portion 42 is press fitted in a corresponding slot 5 in the housing 1 to support the vibrator 40 within the housing 1 in a such a manner as to allow the upper rigid portion 41 to freely vibrate in the lateral direction, or the direction Y perpendicular to the reciprocation of the inner cutter 13 as flexing the resilient legs 44 in the lateral direction Y. The bearing arm 46 which is also similar to that of the drive member 30 is formed into E-shaped configuration with a pair of resilient segments 47 and a center segment 48. The center segment 48 is provided in its free end with a bearing hole 49 into which the eccentric shaft 23 extends for driving connection with the vibrator 40. Each of the resilient segments 47 extends laterally from the upper rigid portion 41 in the same plane of the holder 43 and is capable of flexing only in the reciprocating direction X of the inner cutter 13 so that the rigid portion 41 of the vibrator 40 can be driven to vibrate only in the direction Y perpendicular to the reciprocating direction of the inner cutter 13 upon rotation of the eccentric shaft 23 around the axis of the motor output shaft 21.

The counterweight 50 is secured to the holder 43 by means of a screw 51 to be movable together with the rigid portion 41 of the vibrator 40. It is this counterweight 50 that counterbalances the lateral vibration or inertia force inherently resulting from the employment of the eccentric flyweight 22 for eliminating the inertia force or the vibration in the direction Y, whereby the electric shaver is capable of being dynamically balanced not only in the direction X of the reciprocation but also in the direction Y perpendicular thereto.

Figures 5A, 5B:
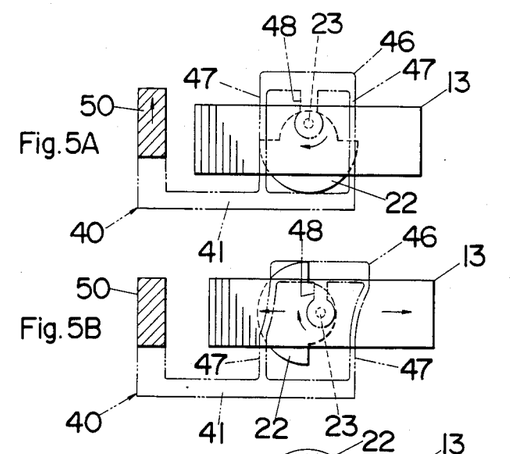
Figures 5C, 5D:
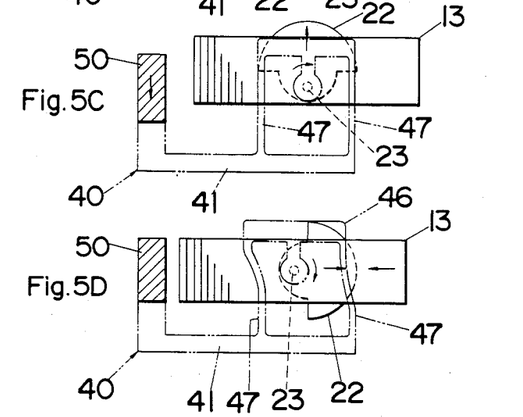

The operation of the vibrator 40 in addition to that of the eccentric flyweight 22 will be further explained with reference to FIG. 5, composed of FIGS. 5A to 5D, illustrating one reciprocation cycle of the inner cutter 13. FIGS. 5A and 5C show the inner cutter 13 in its neutral position with respect to the reciprocating direction X thereof with the flyweight 22 in the opposite positions, while FIGS. 5B and 5D show the counterweight 50 in its neutral position with respect to the lateral direction Y with the flyweight 22 in the opposite positions. When the inner cutter 13 advances from its neutral position of FIG. 5A to the right-most position of FIG. 5B, the eccentric flyweight 22 rotates by 90° in order to counterbalance the inertia force arising from the reciprocation of the inner cutter 13 and acting in the direction X. During this transition phase, the counterweight 50 moves laterally back to its neutral position for counterbalancing the inertia force inherently arising from the eccentric rotation of the flyweight 22 and acting in the lateral direction Y. When the inner cutter 13 returns from the position of FIG. 5B back to its neutral position of FIG. 5C, the eccentric flyweight 22 rotates by 90° in order to counterbalance the inertia force arising from the reciprocation of the inner cutter 13 and acting in the direction X. Also during this transition phase, the counterweight 50 moves laterally away from its neutral position to produce a force counterbalancing the inertia force developed in the direction Y due to the eccentric rotation of the flyweight 22. In the like manner, when the inner cutter 13 advances from its neutral position of FIG. 5C to its left-most position of FIG. 5D, the flyweight 22 rotates in order to counterbalance the inertia force in the direction X and at the same time the counterweight 50 moves laterally back to its neutral position to counterbalance the inertia force acting in that direction Y. Consequently, the combination of the eccentric flyweight 22 and the vibrator 40 carrying the counterweight 50 can eliminate the vibrations acting not only in the direction X of reciprocation of the inner cutter 13 but also in the direction Y perpendicular thereto.

As shown in FIGS. 2 and 3, the vibrator 40 is disposed within the upper portion of the housing 1 with its bearing arm 46 extending between the rigid portion 31 of the drive member 30 and the bearing arm 36 thereof and with the counterweight 50 located outwardly of one longitudinal end of the drive member 30. That is, the counterweight 50 is located longitudinally outwardly of the resilient leg 34 of the drive member 30 in substantially longitudinal alignment with the eccentric flyweight 22 and the drive member 30 so that it can be received in a space S remaining in the upper portion of the housing 1 outwardly of the drive member 30. Such space S is normally present in the electric shaver of the reciprocatory type utilizing the above drive member 30 for reciprocating the inner cutter 13, since the drive member 30 can be made to have much less longitudinal dimension relative to the length of the reciprocating path of the inner cutter 13. In this sense, the counterweight 50 can be located below the inner cutter 13 within the length of the reciprocating path thereof.

Figure 6:
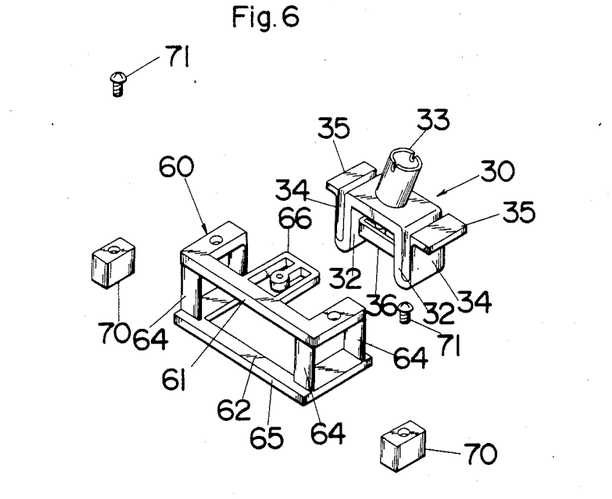
FIG. 6 is a perspective view of a vibrator and drive member employed in an electric shaver in accordance with a second embodiment of the present invention.
Figure 7:
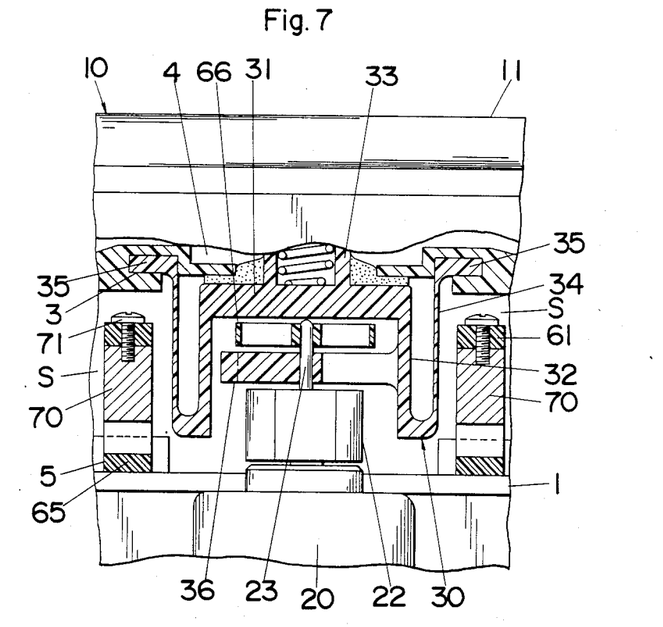
FIG. 7 is a fragmentary front view, partly in section, of the electric shaver adopting the vibrator and drive member of FIG. 6.

FIGS. 6 and 7 illustrate an electric shaver in accordance with a second preferred embodiment of the present invention, which discloses another advantageous vibrator and counterweight combination. The other structures and operations are identical with the above first embodiment and therefore like numerals designates like parts. A vibrator 60 utilized in this embodiment is also molded by plastic into a unitary construction comprising upper and lower rigid portions 61 and 62 which are spaced vertically in parallel relation to each other and elongated in the reciprocating direction X of the inner cutter 13. The upper and lower rigid portions 61 and 62 are linked at either longitudinal end by a pair of resilient legs 64 capable of flexing in the lateral direction so that the upper rigid portion 61 is only allowed to move laterally with respect to the lower rigid portion 62.

Figure 8A:
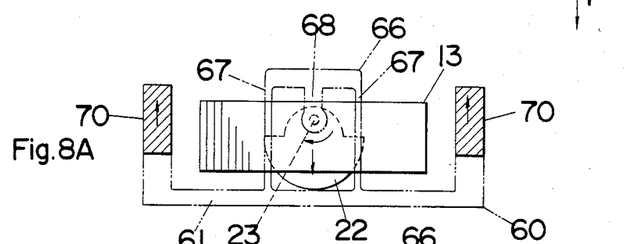
Figures 8B, 8C:
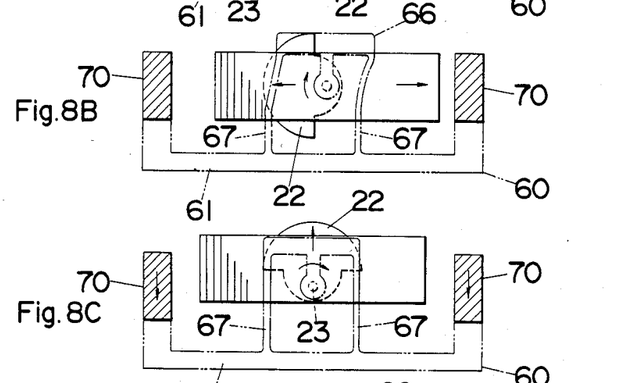
Figure 8D:
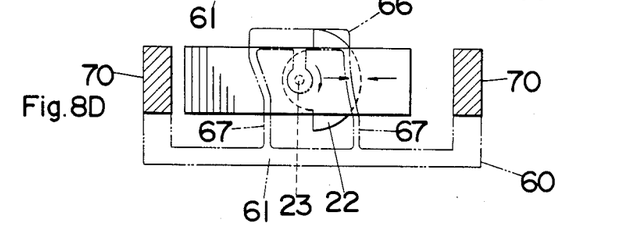

The lower rigid portion 62 includes a mounting flange 65 by which the vibrator 60 is supported in such a way that the upper rigid portion 61 is laterally movable within the housing 1. Centrally formed on the upper rigid portion 61 is a generally E-shaped bearing arm 66 for driving connection with the eccentric shaft 23. The structure and operation of the bearing arm 66 are identical with that disclosed in the previous embodiment and therefore no further description is deemed necessary. Counterweights 70 of equal size and mass are mounted respectively on the opposite longitudinal ends of the upper rigid portion 61 by screws 71 so that they are received in spaces S left within the upper portion of the housing 1 and located longitudinally outwardly of the drive member 30 within the length of the reciprocating path of the inner cutter 13. The above mounting arrangement of the counterweights 70 also gives static balancing to the upper rigid portion 61 of the vibrator 60. The operation of the combination of the vibrator 60 and counterweights 70 is illustrated in FIG. 8, composed of FIGS. 8A to 8D, which is similar to those described with reference to FIG. 5.

Figure 9:
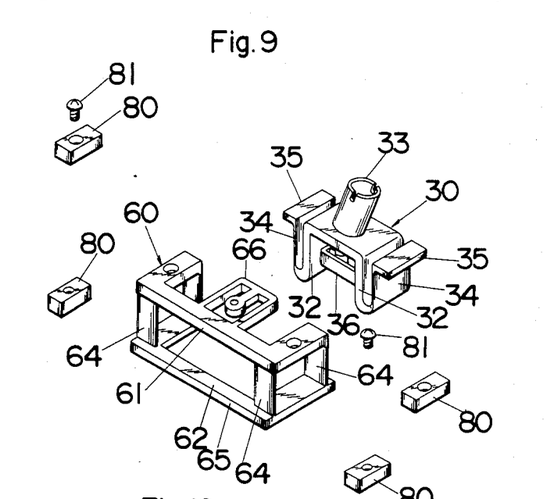
FIG. 9 is a perspective view of a modification of the vibrator and counterweight combination with the associated drive member shown in an exploded representation.
Figure 10:
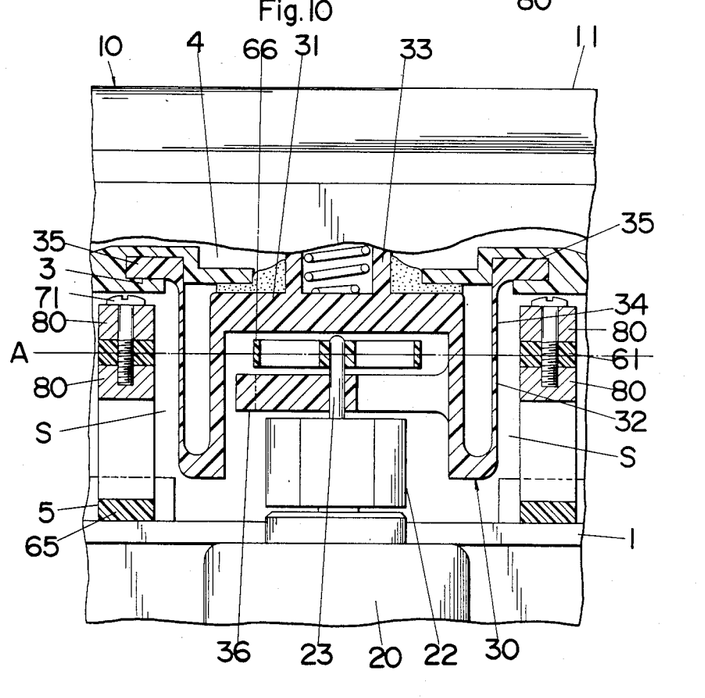
FIG. 10 is a fragmentary front view, partly in section, of the electric shaver incorporating the vibrator with the counterweights and the drive member of FIG. 9.

A modification of the second embodiment is shown in FIGS. 9 and 10 which is identical with the above second embodiment except for the arrangement of the counterweights. Like numerals apply to like parts. In this modification, four pieces of counterweights 80 are carried on the like vibrator 60 with one pair of the counterweights 80 secured on the one longitudinal end of the upper rigid portion 61 and the other pair on the opposite end. The two counterweights 80 in each pair are secured by a screw 81 one on the upper side and the other on the lower side of the upper rigid portion 61 such that the center of the combined mass of the four counterweights 80 is within the same plane A of the connecting portion of the bearing arm 66 with the eccentric shaft 23, as best shown in FIG. 10. In view of that the mass of the plastic made vibrator 60 is much smaller than the combined mass of the counterweights 80 so that it is negligible in relation thereto, the center of the mass of the combination vibrator 60 and counterweights 80 is to be in the same plane A of the connection between the bearing arm 66 and the eccentric shaft 23. This provides balancing of the combination vibrator 60 and counterweights 80 in the axial direction of the eccentric shaft 23 so as to prevent the eccentric shaft 23 from being subject to excessive radial loads in driving the combination vibrator 60 and counterweights 80, which is advantageous for assuring effective power transmission from the eccentric shaft 23 to the vibrator 60 as well as the drive member 30, or the inner cutter 13. In other words, if such excessive radial load should act on the eccentric shaft 23, the smooth translation of rotary motion of the eccentric shaft 23 into the reciprocatory motion of the inner cutter 13 might not be expected, possibly resulting in jerky reciprocating movement of the inner cutter 13.

In consideration of that the eccentric shaft 23 is subject to radial loads to some extent in its operation of driving the drive member 30 and the vibrator 40 (60), and that the drive member 30 is required to receive much greater force from the eccentric shaft 23 for driving the inner cutter 13 and conversely applies the greater radial load to the eccentric shaft 23 than the vibrator 40 (60), the present invention contemplates to keep the influence of such radial loads upon the eccentric shaft 23 at a minimum by the use of an arrangement in which the bearing arm 36 of the drive member 30 is connected to the eccentric shaft 23 at an axial position closer to the root portion thereof than the bearing arm 46 (66) of the vibrator 40 (60), which root portion is known to be responsible for transmitting greater force than the free end portion of the eccentric shaft 23.

Although the above embodiments and modification utilize the vibrators having the common structure of being supported to the housing 1 at the lower end of the resilient leg, it may be possible to utilize an alternate vibrator structure in which the resilient leg is bent upwardly to be formed at its upper end with a mounting flange in the like manner as seen in the drive member 30 so that it can be supported at the upper end of the resilient leg. This arrangement is effective for preventing the vertical displacement or fluctuation of the upper rigid portion of the vibrator during the lateral vibratory motion thereof.

What is claimed is:

1. In a dynamically balanced apparatus having a reciprocating member including:
   a motor having an output shaft;
   an eccentric shaft operatively connected to the output shaft in eccentric relation thereto;
   drive means operatively connecting the eccentric shaft to said reciprocating member for driving the reciprocating member in a reciprocating path upon rotation of the eccentric shaft around the axis of the motor output shaft;
   eccentric flyweight means mounted on the output shaft, to be rotatable therewith for canceling the vibration of the reciprocating member;
   vibrator means operatively connected to the eccentric shaft to be driven thereby to vibrate in a direction perpendicular to the reciprocating path of the reciprocating member; and
   counterweight means carried on the vibrator means to be movable together therewith for canceling the inherent vibration of the eccentric flyweight means acting in the direction perpendicular to the reciprocating path;
   the improvement comprising:
   said counterweight means being disposed at a location spaced longitudinally outwardly from the drive means so as to be in substantially longitudinal alignment with the flyweight means and the drive means.

2. A dynamically balanced apparatus as set forth in claim 1, wherein a single counterweight is disposed outwardly of the drive means to be longitudinally spaced therefrom.

3. A dynamically balanced apparatus as set forth in claim 1, wherein a pair of counterweights are disposed on the opposite sides of the drive means to be longitudinally spaced therefrom.

4. A dynamically balanced apparatus as set forth in claim 1, wherein the connecting portion of the vibrator means with the eccentric shaft and the center of the mass of the combination vibrator and counterweight are arranged to be in the same plane perpendicular to the axis of the eccentric shaft for balancing the combination in the axial direction of the eccentric shaft.

5. In a dynamically balanced apparatus having a reciprocating member comprising in combination:

a motor having an output shaft;

an eccentric shaft operatively connected to the output shaft in eccentric relation thereto;

a drive member operatively connecting the eccentric shaft to said reciprocating member for driving the reciprocating manner in a reciprocating path upon rotation of the eccentric shaft around the axis of the motor output shaft;

an eccentric flyweight mounted on the output shaft to be rotatable therewith for canceling the vibration of the reciprocating member;

a vibrator operatively connected to the eccentric shaft to be driven thereby to vibrate in a direction perpendicular to the reciprocating path of the reciprocating member; and at least one counterweight carried on the vibrator to be movable together therewith for canceling the inherent vibration of the eccentric flyweight acting in the direction perpendicular to the reciprocating path;

the improvement comprising:

said drive member comprising a rigid portion elongated in the reciprocating direction of the reciprocating member and coupled thereto intermediate its ends, a pair of resilient legs integrally extending from the longitudinal ends of the rigid portion and to have the free ends thereof fixed to an apparatus housing for supporting the rigid portion movable only in the reciprocating direction, and a bearing arm extending from the rigid portion for driving connection with the eccentric shaft, said bearing arm being capable of flexing in the direction perpendicular to the reciprocating direction so as to translate the rotary motion of the eccentric shaft only into the reciprocatory motion of the reciprocating member;

said vibrator comprising a rigid portion extending in the reciprocating direction of the reciprocating member and carrying said counterweight at its longitudinal end outwardly of said drive member, resilient leg means extending from the rigid portion and terminating in a mounting flange by which the rigid portion of vibrator is supported within the housing to be movable only in the direction perpendicular to the reciprocating direction, and a bearing arm extending laterally from the rigid portion for driving connection with the eccentric shaft, said bearing arm being capable of flexing in the reciprocating direction so as to translate the rotary motion of the eccentric shaft only into the vibratory motion of the rigid portion carrying the counterweight in the direction perpendicular to the reciprocating direction;

said counterweight being disposed at a location spaced longitudinally outwardly from the drive member so as to be in substantially longitudinal alignment with the flyweight and the drive member; and said drive member and vibrator being connected to the eccentric shaft with the respective bearing arms disposed in such an overlapping relation that the bearing arm of the drive member is connected to the eccentric shaft at an axial position closer to the root portion of the shaft than that of the vibrator.

6. A dynamically balanced apparatus as set forth in claim 5, wherein the counterweight is disposed within the length of the reciprocating path of the reciprocating member.

7. A dynamically balanced apparatus as set forth in claim 5, wherein a pair of counterweights are disposed on the opposite sides of the drive member to be longitudinally spaced therefrom.

8. A dynamically balanced apparatus as set forth in claim 5, wherein said vibrator is formed on its longitudinal ends respectively with the counterweights and formed to have said laterally extending bearing arm intermediate its longitudinal ends, and wherein the connecting portion of the bearing arm of the vibrator with the eccentric shaft and the center of the mass of the vibrator and counterweights combination are arranged in the same plane perpendicular to the axis of the eccentric shaft for balancing the combination in the axial direction of the eccentric shaft.

9. In a dynamically balanced electric shaver having a reciprocating inner cutter comprising in combination:

a motor having an output shaft;

an eccentric shaft operatively connected to the output shaft in eccentric relation thereto;

a drive member operatively connecting the eccentric shaft to said inner cutter for driving it in a reciprocating path upon rotation of the eccentric shaft around the axis of the motor output shaft;

an eccentric flyweight mounted on the output shaft to be rotatable therewith for canceling the vibration of the inner cutter acting in the reciprocating direction thereof;

a vibrator operatively connected to the eccentric shaft to be driven thereby to vibrate in a direction perpendicular to the reciprocating path of the inner cutter; and at least one counterweight carried on the vibrator to be movable together therewith for canceling the inherent vibration of the eccentric flyweight acting in the direction perpendicular to the reciprocating path;

the improvement comprising:

said drive member comprising a rigid portion extending in the reciprocating direction of the inner cutter and coupled to the inner cutter intermediate its longitudinal ends, a pair of resilient legs integrally extending from the longitudinal ends of the rigid portion to have the free ends thereof coupled to a shaver housing for supporting the rigid portion to be movable only in the reciprocating direction, and a bearing arm extending from the rigid portion for driving connection with the eccentric shaft, said bearing arm being capable of flexing in the direction perpendicular to the reciprocating direction of the inner cutter so as to translate the rotary motion of the eccentric shaft only into the reciprocatory motion of the inner cutter;

said vibrator comprising a rigid portion extending in the reciprocating direction of the inner cutter and carrying said counterweight at its longitudinal end outwardly of said drive member, resilient leg means extending from the rigid portion to have at the free end thereof mounting means by which the rigid portion of the vibrator is supported within the shaver housing to be movable only in the direction perpendicular to the reciprocating direction, and a bearing arm extending laterally from the rigid portion for driving connection with the eccentric shaft, said bearing arm being capable of flexing in the reciprocating direction so as to translate the rotary motion of the eccentric shaft only into the vibratory motion of the rigid portion carrying the counterweight in the direction perpendicular to the reciprocating direction;

said counterweight being disposed at a location spaced longitudinally outwardly from the drive member so as to be in substantially longitudinal alignment with the eccentric flyweight and the drive member; and said drive member and vibrator being connected to the eccentric shaft with the respective bearing arms disposed in such an overlapping relation that the bearing arm of the drive member is connected to the eccentric shaft at an axial position closer to the root portion of the shaft than that of the vibrator.

10. A dynamically balanced electric shaver as set forth in claim 9, wherein the counterweight is disposed within the length of the reciprocating path of the reciprocating member to be received in a space left outwardly of the drive member within the shaver housing.

11. A dynamically balanced electric shaver as set forth in claim 9, wherein a pair of counterweights are disposed on the opposite sides of the drive member to be longitudinally spaced therefrom.

12. A dynamically balanced electric shaver as set forth in claim 9, wherein said vibrator is formed on its longitudinal ends respectively with the counterweights and formed to have said laterally extending bearing arm intermediate its longitudinal ends, and wherein the connecting portion of the bearing arm of the vibrator with the eccentric shaft and the center of the mass of the vibrator and counterweights combination are arranged in the same plane perpendicular to the axis of the eccentric shaft for balancing the combination in the axial direction of the eccentric shaft.

* * * * *